W. H. SHUTT.
LOAD WEIGHT CARRYING AND DISTRIBUTING MECHANISM FOR VEHICLES.
APPLICATION FILED JUNE 1, 1917.
1,286,129. Patented Nov. 26, 1918.
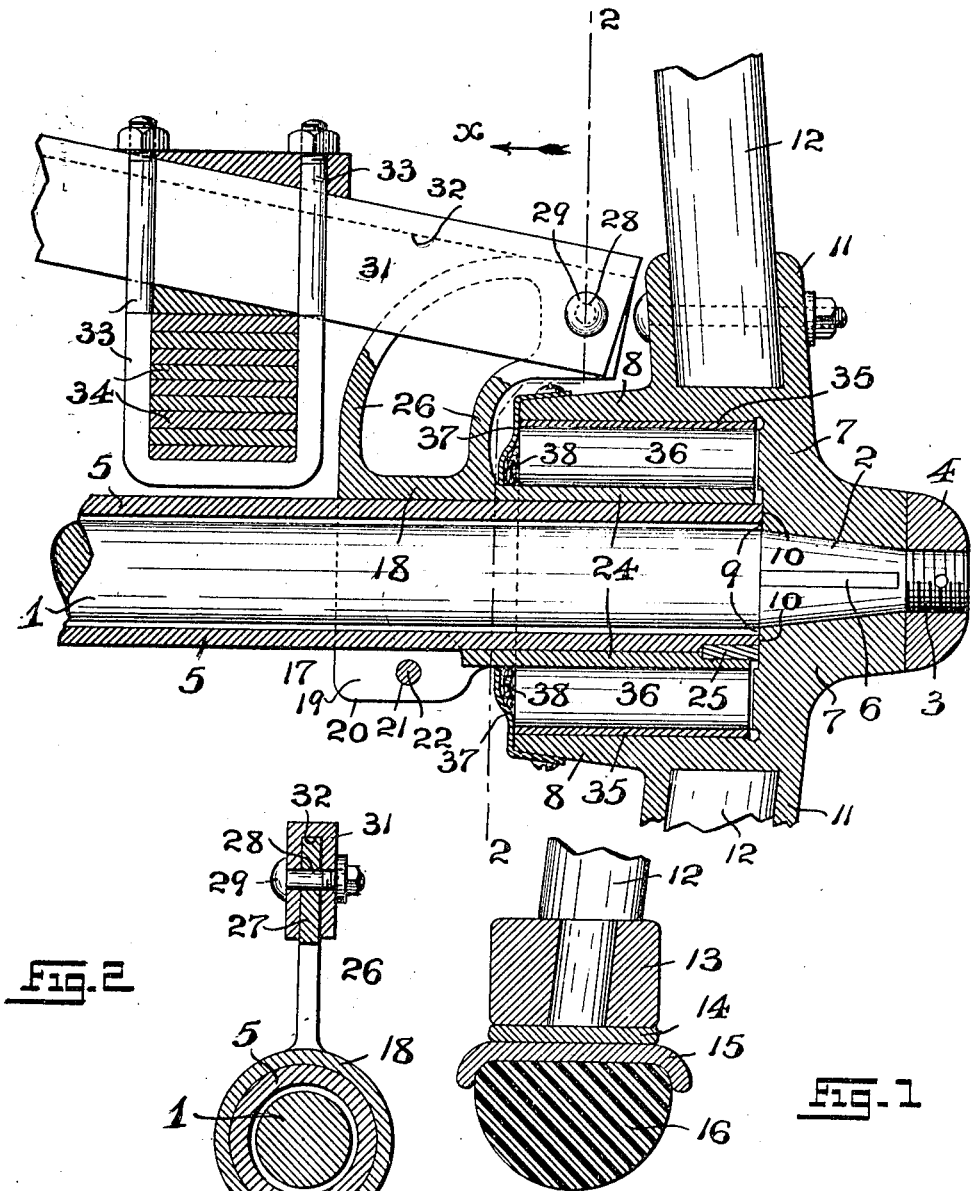
INVENTOR:
Walter H. Shutt,
BY
Fraentzel and Richards
ATTORNEYS.

UNITED STATES PATENT OFFICE.

WALTER H. SHUTT, OF NEWARK, NEW JERSEY.

LOAD-WEIGHT CARRYING AND DISTRIBUTING MECHANISM FOR VEHICLES.

1,286,129.  Specification of Letters Patent.  Patented Nov. 26, 1918.

Application filed June 1, 1917. Serial No. 172,207.

*To all whom it may concern:*

Be it known that I, WALTER H. SHUTT, a citizen of the United States, residing at Newark, in the county of Essex, and State of New Jersey, have invented certain new and useful Improvements in Load-Weight Carrying and Distributing Mechanism for Vehicles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in axles and wheel-supports for vehicles; and the present invention has reference, more particularly, to a novel load-weight carrying and distributing device for the wheels of automobiles, power-driven trucks, tractors, gun-carriages, and other vehicles, and a novel means of suspension of the axle with relation to the wheels, such means for suspension, one at or near each end of the axle, and in which the axle "floats", providing suitable load-carrying members which direct the entire load, both as to the pay-load, that is, the load to be carried upon the vehicle, as well as the entire load of the chassis and axle, to suitable bearings mounted between the hub-portions of said means of suspension and the hub-portions of the wheels, thereby relieving all intermediate parts of the axle of strain and allowing all load-strains to be transmitted from the points or centers of support directly above and to the points of contact with the road.

The present invention has for its principal object to provide a novel arrangement of floating axle and wheel-construction in which the load-weight is carried directly to and within the hub of the wheel, entirely removed from the axle; and, furthermore, to provide a novel means of suspension coöperating directly with the hub of the wheel and the felly or tire thereof, in which the said load-weight is distributed from the point or center of suspension, through the hub of the wheel to the periphery thereof, that is to the felly or tire and thence to the points of contact with the road.

The present invention has for its further object to provide a novel construction of wheel for the purposes above stated, as well as a novel device by means of which the axle is suspended in its relation to the wheels, so as to have a floating relation to the wheels and at the same time be relieved of all load-weights and strains, ordinarily carried by the axle in the present constructions of axles and wheels of automobiles, auto trucks, etc.

Other objects of the present invention not at this time more particularly enumerated will be clearly understood from the following detailed description of the present invention.

With the various objects of the present invention in view, the said invention consists, primarily, in the novel axle, wheel and load-weight distributing device therefor hereinafter more fully set forth; and the invention consists, furthermore, in the novel arrangements and combinations of the various devices and parts, as well as in the details of the construction of the said parts, all of which will be described in detail in the following specification and then finally embodied in the clauses of the claims which are appended to and which form an essential part of the said specification.

The invention is fully illustrated in the accompanying drawings, in which:—

Figure 1 represents partly in longitudinal vertical section and partly in elevation, a unit showing one embodiment of the principles of the present invention, and illustrating furthermore the principle of carrying the load in the manner heretofore set forth; and Fig. 2 is a transverse sectional representation taken on line 2—2 in said Fig. 1, looking in the direction of the arrow *x*.

Similar characters of reference are employed in the said above described views, to indicate corresponding parts.

Referring now to the said drawings, in which are represented but one end-portion of the axle and the various parts and devices, this being deemed sufficient to clearly illustrate the principles of the present invention, the reference-character 1 indicates an axle which may be tapered at its ends, as at 2, and may be provided with a screw-threaded end-portion 3, for the reception thereon of a nut 4, or other suitably formed securing or retaining member, the said axle being loosely and rotatably disposed within a suitably formed tube, as 5, said tube providing a suitable shell or casing for the axle, and usually forming part of the transmission or differential gear casing which, however, is not shown in the accompanying drawings.

Suitably mounted upon the portion 2 of the axle 1, so as to turn with the latter, by being keyed thereon, as at 6, or by being secured upon the axle in any other suitable manner, is the hub-member 7 of the wheel, said hub-member being provided upon that side toward the chassis of the vehicle with an annular flange, as 8, providing with the wall-portion 9 a chamber or receiving element, as will be clearly understood from an inspection of Fig. 1 of the drawings.

As shown in said Fig. 1, the end-portion of the said tube 5 extends into this chamber or receiving element, having its end-surface 10 abutting, preferably, upon said wall-portion 9. The said hub-member 7 is provided with any suitable arrangement of annularly disposed spoke-receiving sockets 11, which may incline in the manner shown, and for the purposes presently more fully set forth, in which sockets are disposed and suitably secured the inner end-portions of the wheel-spokes 12, said spokes having mounted upon their outer ends, in any usual manner, a felly 13, rim 14, flange-iron 15, and rubber tire 16. Any other arrangement and assemblage of such wheel-parts may, however, be employed, as will be clearly evident.

The herein-before mentioned means of suspension, which also constitutes the load-weight distributing element, is indicated in general by the reference-character 17, the said device or element comprising a sleeve-like body 18 which is slitted, as at 19, so as to provide a pair of lugs or ears 20, said ears being perforated, as at 21, for the reception of a tightening bolt 22 and a nut 23, by means of which the said body 18, when slipped in its proper position upon the tube 5, can be firmly and securely clamped in its fixed position upon said tube. The said body 18 is also provided with a laterally projecting sleeve-member or hub 24 which is also mounted upon said tube 5 and extends into the previously mentioned chamber or receiving element formed by the annular flange 8 of the hub-member 7, substantially as shown in said Fig. 1 of the drawings. The said sleeve-member or hub 24 may also be secured in its fixed position upon the said tube 5 by means of a key 25, as shown in said Fig. 1, or any other suitable fastening means may be employed, if desired. Extending in an upward direction from the said body 18 is a supporting element or member, as 26, having a projecting portion, as 27, which is provided with a hole or perforation 28, see Fig. 2, the center of which is in vertical alinement with the points of contact of the wheel with the road, as will be fully evident from an inspection of said Fig. 1 of the drawings. Suitably secured to the side of said portion 27, by means of a bolt 29 and nut 30, or by means of other suitable fastening device or devices, is the end-portion of a laterally extending cross-bar or member 31, usually U-shaped in cross-section, the portion 32 of said bar or member 31 resting directly upon the upper edge-portion of the projecting portion 27 of said supporting element or member 26, substantially in the manner shown.

Suitably connected with said cross-bar or member 31, by means of a fastening device, as 33, or any other suitable securing means, is a form of spring-suspension, as 34, such as is commonly used with vehicles.

Disposed within the chamber or receiving element formed by the annular flange 8 of the hub-member 7 is a cylindrical shell, casing or lining 35, in which are suitably disposed, so as to be in supporting and rolling contact with the sleeve-member or hub 24, a plurality of rollers 36, forming a roller-bearing, or other suitably constructed bearing, as will be evident, the open end-portion of the said sleeve-like body 18 being suitably closed by means of a dust-cap 37, or the like, usually of the form shown in Fig. 1 of the drawings. Felt or other packing material 38 may be held and retained in place by means of said cap for retaining the lubricant that may be used within said bearing.

Having in the foregoing described the general arrangements and combinations of the several devices and parts in their assembled relations to produce a load-weight carrying and distributing mechanism, and having furthermore stated the principles of my present invention any further description is deemed unnecessary.

Of course, I am aware that changes may be made in the general arrangements and combinations of the various devices and parts, as well as in the details of the construction of said parts, without departing from the scope of the said invention as set forth in the foregoing specification, and as defined in the clauses of the claims, which are appended thereto. Hence, I do not limit my present invention to the exact arrangements and combinations of the various devices and parts as described in the said specification, nor do I confine myself to the exact details of the construction of the said parts, as illustrated in the accompanying drawings.

I claim:—

1. A load-weight carrying and distributing device of the character specified, comprising a wheel having an inwardly extending tubular hub, and a tubular element extending into said hub, said wheel and its hub being rotatably disposed with relation to said tubular element, an axle within said tubular element, a load-weight carrying and distributing means mounted upon said tubular element, said load-weight carrying and distributing means carrying means for the suspension of a chassis or other body, the point of suspension lying above said hub and being substantially in the vertical plane passing through the periphery of the wheel.

2. A load-weight carrying and distributing device of the character specified, comprising a wheel, having an inwardly extending tubular hub, and a tubular element extending into said hub, said wheel and its hub being rotatably disposed with relation to said tubular element, an axle within said tubular element, a load-weight carrying and distributing means mounted upon said tubular element, said load-weight carrying and distributing means having a cross-bar attaching member connected therewith, a cross-bar attached near its end-portion to said attaching member, and means of suspension connected with said cross-bar, the point of suspension lying above said hub and being substantially in the vertical plane passing through the periphery of the wheel.

3. A load-weight carrying and distributing device of the character specified, comprising a wheel having an inwardly extending tubular hub, and a tubular element extending into said hub, said wheel and its hub being rotatably disposed with relation to said tubular element, an axle within said tubular element, a load-weight carrying and distributing means mounted upon said tubular element, said load-weight carrying and distributing means comprising a sleeve-like body surrounding said tubular element, means for securing said body in a fixed position upon said tubular element, an upwardly extending and laterally projecting supporting member connected with said body, and means mounted upon the laterally projecting portion of said supporting member for the suspension of a chassis or other body, the point of suspension lying above said hub and being substantially in the vertical plane passing through the periphery of the wheel.

4. A load-weight carrying and distributing device of the character specified, comprising a wheel having an inwardly extending tubular hub, and a tubular element extending into said hub, said wheel and its hub being rotatably disposed with relation to said tubular element, an axle within said tubular element, a load-weight carrying and distributing means mounted upon said tubular element, said load-weight carrying and distributing means comprising a sleeve-like body surrounding said tubular element, means for securing said body in a fixed position upon said tubular element, an upwardly extending and laterally projecting supporting member connected with said body, a cross-bar attached to said laterally projecting supporting member and a means of suspension connected with said cross-bar, the point of suspension lying above said hub and being substantially in the vertical plane passing through the periphery of the wheel.

5. A load-weight carrying and distributing device of the character specified, comprising a wheel, an annular flange extending from the hub-portion of said wheel, said flange providing a receiving chamber, and a tubular element having its end-portion extending into said chamber, said wheel being rotatably disposed with relation to said tubular element, an axle "floatably" disposed with relation to and within said tubular element, a load-weight carrying and distributing means mounted upon said tubular element, said load-weight carrying and distributing means having a cross-bar attaching member connected therewith, a cross-bar attached near its end-portion to said attaching member, and a means of suspension connected with said cross-bar.

6. A load-weight carrying and distributing device of the character specified, comprising a wheel, an annular flange extending from the hub-portion of said wheel, said flange providing a receiving chamber, and a tubular element having its end-portion extending into said chamber, said wheel being rotatably disposed with relation to said tubular element, an axle "floatably" disposed with relation to and within said tubular element, a load-weight carrying and distributing means mounted upon said tubular element, said load-weight carrying and distributing means comprising a sleeve-like body surrounding said tubular element, means for securing said body in a fixed position upon said tubular element, a sleeve-member or hub extending laterally from said body, said sleeve-member or hub being mounted upon said tubular element and projecting into said receiving chamber, an upwardly extending and laterally projecting supporting member connected with said body, and means mounted upon the laterally projecting portion of said supporting member for the suspension of a chassis or other body.

7. A load-weight carrying and distributing device of the character specified, comprising a wheel, an annular flange extending from the hub-portion of said wheel, said flange providing a receiving chamber, and a tubular element having its end-portion extending into said chamber, said wheel being rotatably disposed with relation to said tubular element, an axle "floatably" disposed with relation to and within said tubular element, a load-weight carrying and distributing means mounted upon said tubular element, said load-weight carrying and distributing means comprising a sleeve-like body surrounding said tubular element, means for securing said body in a fixed position upon said tubular element, a sleeve-member or hub extending laterally from said body, said sleeve-member or hub being mounted upon said tubular element and projecting into said receiving chamber, an upwardly extending and laterally projecting supporting member connected with said body, a cross-bar attached to said laterally projecting supporting member, and a means of suspension connected with said cross-bar.

8. A load-weight carrying and distributing device of the character specified, comprising a wheel, an annular flange extending from the hub-portion of said wheel, said flange providing a receiving chamber, and a tubular element having its end-portion extending into said chamber, said wheel being rotatably disposed with relation to said tubular element, an axle "floatably" disposed with relation to and within said tubular element, a load-weight carrying and distributing means mounted upon said tubular element, said load-weight carrying and distributing means having a cross-bar attaching member connected therewith, a cross-bar attached near its end-portion to said attaching member, and a means of suspension connected with said cross-bar, and an anti-friction bearing-element disposed within the receiving chamber of said wheel.

9. A load-weight carrying and distributing device of the character specified, comprising a wheel, an annular flange extending from the hub-portion of said wheel, said flange providing a receiving chamber, and a tubular element having its end-portion extending into said chamber, said wheel being rotatably disposed with relation to said tubular element, an axle "floatably" disposed with relation to and within said tubular element, a load-weight carrying and distributing means mounted upon said tubular element, said load-weight carrying and distributing means comprising a sleeve-like body surrounding said tubular element, means for securing said body in a fixed position upon said tubular element, a sleeve-member or hub extending laterally from said body, said sleeve-member or hub being mounted upon said tubular element and projecting into said receiving chamber, an anti-friction bearing-element disposed within the receiving chamber of said wheel and surrounding said laterally extending sleeve-member or hub, an upwardly extending and laterally projecting supporting member connected with said body, and means mounted upon the laterally projecting portion of said supporting member for the suspension of a chassis or other body.

10. A load-weight carrying and distributing device of the character specified, comprising a wheel, an annular flange extending from the hub-portion of said wheel, said flange providing a receiving chamber, and a tubular element having its end-portion extending into said chamber, said wheel being rotatably disposed with relation to said tubular element, an axle "floatably" disposed with relation to and within said tubular element, a load-weight carrying and distributing means mounted upon said tubular element, said load-weight carrying and distributing means comprising a sleeve-like body surrounding said tubular element, means for securing said body in a fixed position upon said tubular element, a sleeve-member or hub extending laterally from said body, said sleeve-member or hub being mounted upon said tubular element and projecting into said receiving chamber, an anti-friction bearing-element disposed within the receiving chamber of said wheel and surrounding said laterally extending sleeve-member or hub, an upwardly extending and laterally projecting supporting member connected with said body, a cross-bar attached to said laterally projecting supporting member, and a means of suspension connected with said cross-bar.

In testimony that I claim the invention set forth above I have hereunto set my hand this 28th day of May, 1917.

WALTER H. SHUTT.

Witnesses:
 FRED'K C. FRAENTZEL,
 FRED'K H. W. FRAENTZEL.

Copies of this patent may be obtained for five cents each, by addressing the "Commissioner of Patents, Washington, D. C."